United States Patent [19]

Kimura et al.

[11] 4,388,093
[45] Jun. 14, 1983

[54] PROCESS FOR PRODUCING A GLASS FIBER FOR LIGHT TRANSMISSION

[75] Inventors: Takao Kimura, Mito; Toru Yamanishi, Yokohama, both of Japan

[73] Assignees: Nippon Telegraph & Telephone Public Corporation, Tokyo; Sumitomo Electric Industries, Ltd., Osaka, both of Japan

[21] Appl. No.: 333,960

[22] Filed: Dec. 23, 1981

[30] Foreign Application Priority Data

Dec. 26, 1980 [JP] Japan .................................. 55-187360

[51] Int. Cl.³ ........................................ C03B 37/025
[52] U.S. Cl. .................................... 65/3.11; 65/3.4; 65/3.41; 65/3.43; 65/12; 427/44; 427/54.1; 427/163
[58] Field of Search .................... 65/3.11, 3.43, 3.4, 65/3.41, 3.44, 12; 427/143, 54.1, 44

[56] References Cited

U.S. PATENT DOCUMENTS 4,208,200  6/1980  Claypode et al. ..................... 65/12
4,351,657  9/1982  Kimura et al. ....................... 427/163

FOREIGN PATENT DOCUMENTS 53-125036  11/1978  Japan .................................. 65/3.11
54-39648   3/1979   Japan .................................. 427/163

OTHER PUBLICATIONS

Kimura et al., "Conference & Sixth European Conference on Optical Communications" York, England (Sep. 16-19, 1980) pp. 57-60.

Primary Examiner—William F. Smith
Attorney, Agent, or Firm—Sughrue, Mion, Zinn, Macpeak and Seas

[57] ABSTRACT

A process for producing an optical fiber is described, wherein a fiber that has been drawn from a glass preform is coaed with a resin composition curable with heat, ultraviolet rays, or electron beams, and then cured, wherein before the drawn fiber contacts another solid object, the fiber is cooled by being passed through a cooling means filled with a non-reactive liquid material which is the same as said resin composition except that it is free from any compound that catalyzes curing of the resin, selected from among a curing agent, a cross-linking agent, curing catalyst, curing accelerator, sensitizing agent and a reactive diluent, and then the fiber is coated and with said resin composition and cured.

4 Claims, 1 Drawing Figure

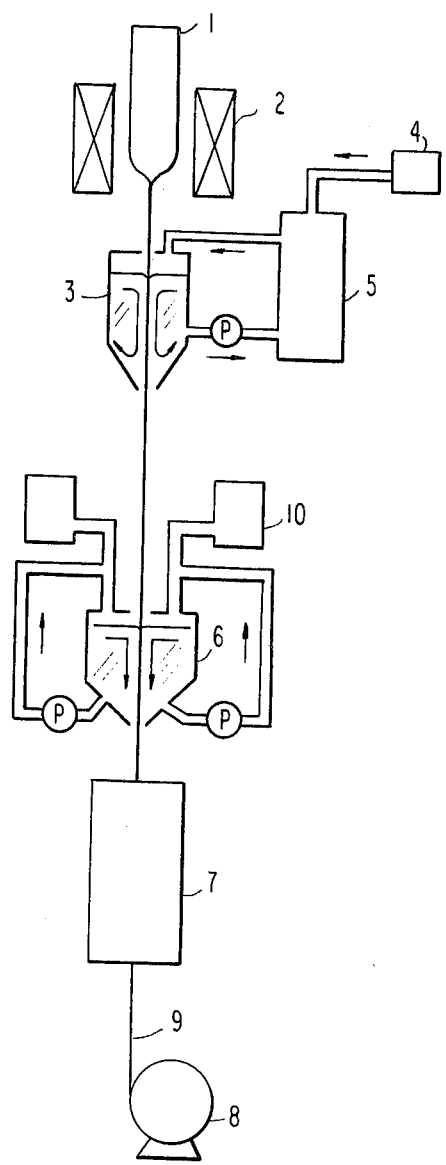

PROCESS FOR PRODUCING A GLASS FIBER FOR LIGHT TRANSMISSION

FIELD OF THE INVENTION

The present invention relates to a high-speed process for drawing a glass fiber for light transmission (hereafter referred to as an "optical fiber").

BACKGROUND OF THE INVENTION

A method is know for producing an optical fiber by first drawing a perform into a fiber as it is melted in a resistance furnace, high-frequency furnace, with a $CO_2$ laser, or with oxyhydrogen flame, and then coating the fiber with a resin composition before it contacts another solid object, followed by curing of the resin coating (see, for example, Japanese Patent Application (OPI) No. 100734/76, wherein the symbol OPI refers to an unexamined published Japanese Patent Application). This coating process is generally referred to as a tandem primary coating process, which, for industrial purposes, must be executed at high speed. To achieve this object, the following three requirements must be met.

First, the resin coating must be cured in a short period. It is known that a speed of at least several hundred meters per minute can be achieved by replacing the conventional electric furnace with an IR image furnace or UV irradiation furnace.

The second requirement originates from the fact that if the preform is drawn at a speed of 100 m/min or more at about 2000° C., the fiber is supplied to a resin-filled coating apparatus before it is cooled to around room temperature, so that the resin composition is decomposed or cured in the coating apparatus. It is therefore necessary that some kind of cooling means be provided between the drawing furnace and the coating applicator. Japanese Patent Application (OPI) No. 10470/80 discloses one example of such cooling means through which a gaseous coolant (e.g., from liquid nitrogen) is made to flow to cool the fiber down to about room temperature. However, this idea of using a gaseous coolant has two problems: first, because of its small heat capacity, the gas has only a small cooling effect, and hence it must be used in a huge volume to cool the fiber to the desired temperature, and secondly, such gas typically contains a trace amount of moisture that reduces the strength of the fiber.

The third requirement is to minimize an uneven resin coating on the surface of optical fiber due to the relative slipping between the optical fiber and the resin composition when the fiber is coated at a high speed such as 100 m/min. or more.

SUMMARY OF THE INVENTION

Therefore, one object of the present invention is to provide a process for producing an optical fiber that uses a new cooling method that facilitates the high-speed drawing of an optical fiber preform.

Therefore, according to this invention, there is provided a process for producing an optical fiber wherein a fiber that has been drawn from a glass preform is coated with a resin composition curable with heat, ultraviolet rays, or electron beams, and then cured, wherein before the drawn fiber contacts another solid object said fiber is cooled by being passed through a cooling means filled with a non-reactive liquid material which is the same as said resin composition except that it is free from any compound selected from among a curing agent, cross-linking agent, curing catalyst, curing accelerator, sensitizing agent, and a reactive diluent, and then the fiber is coated with said resin composition and cured.

BRIEF DESCRIPTION OF THE DRAWING

FIGURE is a schematic representation of the process of the present invention.

PREFERRED EMBODIMENT OF THE INVENTION

The present invention provides a process for producing an optical fiber wherein a preform is drawn, e.g., in a resistance furnace, a high-frequency furnace, or by other heat sources such as oxyhydrogen flame or $CO_2$ laser, and the fiber is coated with a curable resin composition before it contacts another solid object, followed by curing of the resin coating. Before the drawn fiber is sent to the coating applicator, it is passed through a cooling means filled with a "a non-reactive liquid material" that is essentially made of the same material as the resin composition except that it is free from any compound selected from among a curing agent, cross-linking agent, curing catalyst, curing accelerator, sensitizing agent, and reactive diluent, and which hence is not cured at elevated temperatures. By cooling the fiber with the non-reactive liquid material and subsequently coating and curing the resin composition onto the fiber, a desired optical fiber can be obtained at a drawing speed of 100 m/min or more, without decreasing its strength (as is often the case when a moisture-containing gas is used as a coolant).

In coating the fiber with the resin composition, it is preferred that the resin composition in a coating applicator is forced to flow by an appropriate means such as pump(s) so as to minimize the difference in relative speed between the fiber passing through the coating applicator and the resin composition in the coating applicator.

One embodiment of the coating applicator that is used in the process of the present invention is shown schematically in FIGURE, wherein a fiber preform indicated by the numeral 1 is heated in a drawing furnace 2 at about 2000° C. to form a fiber having an outside diameter of about 150μ, which is passed through a cooling means 3 where it is cooled to about room temperature. The cooled fiber is supplied to a coating applicator 6 where it is given a resin coating, which is cured in curing furnace 7, and the fiber 9 with the cured resin coating thereon is taken up by a winder 8. In the cooling means 3, the "non-reactive liquid material" forms a convection current that cools the fiber passing through the coller (indicated by arrows), and a thin layer of the liquid material adheres to the fiber and is carried into the coating applicator through an opening in the bottom of the cooler. The liquid material in the cooler is cooled by being fed back to a heat exchanger 5. The non-reactive liquid material in the cooling means 3 is preferably forced to flow in the same direction as that of fiber passing through the cooler by means of pump(s). In this manner, cooling can be achieved effectively by preventing shipping between the liquid material and the fiber due to the reduction in viscosity of the liquid material caused by contacting the liquid material with the fiber having a high temperature.

The opening at the bottom orifice of cooler 3 and the coating applicator 6 has a diameter slightly larger than that of the fiber passing therethrough, and the diameter of the opening can be determined so that essentially no liquid flow occurs therefrom, in consideration of various factors such as fiber diameter, viscosity and surface tension of the liquid material or the resin composition, fiber speed and the like.

It is desired that the optical fiber passing through the cooler not contact a material other than the "non-reactive liquid material". Any decrease in the amount of the "non-reactive liquid material" due to sticking to the fiber is compensated for by an additional supply from an automatic feeder 4. Also, any decrease in the amount of the resin composition in the coating applicator 6 due to the coating of the fiber can be compensated for by an additional supply from an automatic feeder 10.

The "non-reactive liquid material" used as a coolant in the present invention is the same as the resin composition to be coated on the fiber except that it is free from any compound that catalyzes curing of the resin, selected from among a cross-linking agent, curing agent, curing catalyst, curing promoter, sensitizing agent and reactive diluent necessary for initiating the curing reaction, so the "non-reactive liquid material" may adhere to the fiber and enter the coating applicator without causing any adverse effect.

The resin composition with which the fiber is coated and cured is one or more reactive monomers that are liquid at ordinary temperatures, e.g., room temperature, and which contains at least one compound selected from among a curing agent, curing promoter, curing catalyst, cross-linking agent, sensitizing agent, reactive diluent, filler and adhesion modifier. As set forth above, the "non-reactive liquid material" is the same as the resin composition except that it is free from any compound that catalyzes curing, so it may contain other additives such as filler, adhesion modifier and the like which may be present in the resin composition so long as the non-reactive liquid material does not cause a curing reaction when it is heated.

Resins that may comprise the main component of the resin composition include organopolysiloxane (silicone resin), polyurethane, polyester, polybutadiene, epoxy resin, polyimide and polyamideimide, but it should be understood that any resin compond can be used without limitation if the resin compound without additional materials necessary for the curing reaction does not undergo a curing reaction by heat and can be used as a coolant.

As discussed above, the present invention cools a hot fiber with a medium that does not cause a curing reaction with heat, so it enables high-speed melt-spinning of optical fibers. As a further advantage, the medium may adhere to the fiber and enter the coating applicator without causing any deleterious effect, and the fiber is coated with a very good resin before it contacts another solid object. Therefore, an optical fiber having high strength can be produced by the present invention.

While the invention has been described in detail and with reference to specific embodiment thereof, it will be apparent to one skilled in the art that various changes and modifications can be made therein without departing from the spirit and scope thereof.

What is claimed is:

1. A process for producing an optical fiber wherein a fiber that has been drawn from a glass preform is coated with a resin composition curable with heat, ultraviolet rays, or electron beams, and then cured, wherein before the drawn fiber contacts another solid object said fiber is cooled by being passed through a cooling means filled with a non-reactive liquid material which is the same as said resin composition except that it is free from any compound that catalyzes curing of the resin, selected from among a curing agent, cross-linking agent, curing catalyst, curing accelerator, sensitizing agent, and a reactive diluent, and then the fiber is coated with said resin composition and cured.

2. A process for producing an optical fiber as in claim 1, wherein said resin composition is selected from an organopolysiloxane, polyurethane, polyester, polybutadiene, epoxy resin, polyimide and polyamideimide.

3. A process for producing an optical fiber as in claim 1, wherein said non-reactive liquid material in said cooling means is forced to flow in the same direction as that of said optical fiber passing through said cooling means.

4. A process for producing an optical fiber as in claim 1, wherein said resin composition in a coating applicator is forced to flow in the same direction as that of said optical fiber passing through said coating applicator.

* * * * *